US012555904B2

(12) United States Patent
Guo et al.

(10) Patent No.: US 12,555,904 B2
(45) Date of Patent: Feb. 17, 2026

(54) ASSEMBLY FOR BASE STATION ANTENNA, PHASE SHIFTER AND THE BASE STATION ANTENNA

(71) Applicant: Outdoor Wireless Networks LLC, Claremont, NC (US)

(72) Inventors: Pengfei Guo, Suzhou (CN); Hangsheng Wen, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 317 days.

(21) Appl. No.: 17/904,773

(22) PCT Filed: Mar. 3, 2021

(86) PCT No.: PCT/US2021/020619
§ 371 (c)(1),
(2) Date: Aug. 22, 2022

(87) PCT Pub. No.: WO2021/178505
PCT Pub. Date: Sep. 10, 2021

(65) Prior Publication Data
US 2023/0031553 A1    Feb. 2, 2023

(30) Foreign Application Priority Data
Mar. 4, 2020   (CN) .......................... 202010143265.2

(51) Int. Cl.
*H01Q 3/26*    (2006.01)
*H01Q 1/24*    (2006.01)
(Continued)

(52) U.S. Cl.
CPC ............. *H01Q 3/267* (2013.01); *H01Q 1/246* (2013.01); *H01Q 3/26* (2013.01); *H01Q 3/36* (2013.01); *H01Q 21/0006* (2013.01)

(58) Field of Classification Search
CPC .......... H01Q 3/267; H01Q 1/246; H01Q 3/26; H01Q 3/36; H01Q 21/0006; H01Q 3/32;
(Continued)

(56) References Cited

U.S. PATENT DOCUMENTS 10,511,088 B2    12/2019    Xiao et al.
10,553,958 B2    2/2020    Xiao et al.
(Continued)

FOREIGN PATENT DOCUMENTS

CN    202423563 U    9/2012
CN    107799896 A    3/2018
(Continued)

OTHER PUBLICATIONS

"International Search Report and Written Opinion of the International Searching Authority", International Application No. PCT/US2021/020619, Jul. 14, 2021, 28 pp.
(Continued)

*Primary Examiner* — Vladimir Magloire
*Assistant Examiner* — Remash R Guyah
(74) *Attorney, Agent, or Firm* — Myers Bigel, P.A.

(57) ABSTRACT

An assembly for a base station antenna includes a calibration device and at least one phase shifter mounted on the calibration device. The at least one phase shifter is electrically connected to the calibration device without a cable. The phase shifter may be mounted on the calibration device at an angle (e.g., perpendicular to the calibration device).

18 Claims, 4 Drawing Sheets

(51) Int. Cl.
*H01Q 3/36* (2006.01)
*H01Q 21/00* (2006.01)

(58) Field of Classification Search
CPC .......... H01Q 1/00; H01Q 3/30; H04L 7/0016;
H04L 27/3863; H04L 5/0048; H04B 7/10;
H04B 17/12; H04B 17/21; H03H 11/20;
H03F 1/3282; H03F 3/195; H03F 3/211;
H03F 2200/336; H01P 1/18; H01P 1/184;
H01P 1/181; H01P 1/185; H01P 1/19;
H04W 72/54; H04W 72/044; H04W
24/10; H04W 48/20; H04W 92/12; H04W
24/02; H04W 88/085; H04W 16/26;
H04W 72/53
USPC ....... 342/371, 882, 174; 455/67.11; 370/330
See application file for complete search history.

(56) References Cited

U.S. PATENT DOCUMENTS

| | | | |
|---|---|---|---|
| 10,812,200 B2 | 10/2020 | Li et al. | |
| 10,819,069 B2 | 10/2020 | Zhang et al. | |
| 10,992,054 B2 | 4/2021 | Xiao et al. | |
| 2004/0032365 A1* | 2/2004 | Gottl | H01Q 3/267 342/368 |
| 2005/0046514 A1* | 3/2005 | Janoschka | H01P 1/184 333/156 |
| 2011/0063049 A1* | 3/2011 | Bradley | H01P 1/184 333/161 |
| 2013/0078825 A1* | 3/2013 | Wain | H05K 3/366 29/830 |
| 2013/0235962 A1* | 9/2013 | O'Keefe | H04B 17/12 375/371 |
| 2018/0316092 A1* | 11/2018 | Cai | H01P 5/185 |
| 2018/0323771 A1 | 11/2018 | Maruyama et al. | |
| 2019/0334636 A1* | 10/2019 | Li | G01R 29/10 |
| 2020/0220252 A1 | 7/2020 | Xiao et al. | |
| 2020/0404675 A1* | 12/2020 | Ou | H04W 72/54 |
| 2022/0006167 A1* | 1/2022 | P | H01Q 21/08 |
| 2022/0037753 A1* | 2/2022 | Tang | H01Q 19/10 |

FOREIGN PATENT DOCUMENTS

| | | |
|---|---|---|
| CN | 107819198 B | 3/2020 |
| CN | 210430115 U | 4/2020 |
| CN | 111384600 A | 7/2020 |
| CN | 108432051 B | 9/2020 |
| CN | 211829165 U | 10/2020 |
| CN | 108736276 B | 4/2021 |
| CN | 109841963 B | 6/2021 |
| CN | 107004951 B | 8/2021 |
| EP | 3923416 A1 | 12/2021 |

OTHER PUBLICATIONS

"Invitation to Pay Additional Fees and, Where Applicable, Protest Fee", International Application No. PCT/US2021/020619, Apr. 20, 2021, 2 pp.

Moon, Thomas, et al., "Online Millimeter Wave Phased Array Calibration Based on Channel Estimation", 2019 IEEE 37th VLSI Test Symposium (VTS), Monterey, CA, USA,, Apr. 23-25, 2019, 6 pp.

English Translation of Chinese Office Action dated Apr. 18, 2025 for corresponding Application No. 202010143265.2, 11 pages.

* cited by examiner

ASSEMBLY FOR BASE STATION ANTENNA, PHASE SHIFTER AND THE BASE STATION ANTENNA

CROSS-REFERENCE TO RELATED APPLICATIONS

The present application is a 35 U.S.C. § 371 national stage applications of PCT Application No. PCT/US2021/020619, filed on Mar. 3, 2021, which itself claims priority to Chinese Patent Application No. 202010143265.2, filed Mar. 4, 2020, the entire contents of both of which are incorporated herein by reference as if set forth fully herein in their entireties.

FIELD

The present invention generally relates to radio communications. More specifically, the present invention relates to assemblies for base station antennas with integrated calibration device and phase shifter, phase shifters and the base station antennas.

BACKGROUND

Due to the growing demand for wireless communications, multi-band base station antennas, Multiple-Input Multiple-Output (MIMO) technology, and beamforming technology have been rapidly developed to support different services and massive data transmission. However, with the integration of more and more frequency bands and RF ports in one base station antenna, the layout of the feed networks and the wiring of cables become more complicated. Therefore, how to achieve high integration and miniaturization of the overall antenna construction has been a technical problem urgently to be solved by those skilled in the art in the recent years.

SUMMARY

According to a first aspect of the present invention, there is an assembly for a base station antenna provided. The assembly includes a calibration device and at least one phase shifter mounted on the calibration device, wherein the at least one phase shifter is electrically connected to the calibration device without a cable.

In some embodiments, the phase shifter is mounted on the calibration device at an angle with respect to the calibration device. In some embodiments, the angle is within the range of 60° to 120°.

In some embodiments, the phase shifter is mounted perpendicular to the calibration device.

In some embodiments, the calibration device has a first transmission segment for RF signals, and the phase shifter has a second transmission segment for RF signals, wherein the second transmission segment is electrically connected to the first transmission segment. In some embodiments, the second transmission segment of the phase shifter is configured as a bent trace segment. In some embodiments, the second transmission trace segment includes a first segment and a second segment bent and extending from the first segment toward the calibration device. In some embodiments, the second segment is welded to the first transmission segment.

In some embodiments, the phase shifter includes a second transmission segment for RF signals and a tuning trace segment spaced apart from the second transmission segment.

In some embodiments, the tuning trace segment extends from the second transmission segment toward the calibration device.

In some embodiments, the calibration device has a first transmission segment for RF signals, and the tuning trace segment is welded to both the first transmission segment and the second transmission segment.

According to a second aspect of the present invention, there is an assembly for a base station antenna provided. The assembly includes a calibration device and at least one phase shifter mounted on the calibration device, wherein the phase shifter is mounted on the calibration device at an angle with respect to the calibration device.

In some embodiments, the angle is within the range of 60° to 120°.

In some embodiments, the phase shifter is mounted perpendicular to the calibration device.

In some embodiments, the calibration device has a first transmission segment for RF signals, the phase shifter has a second transmission segment for RF signals, and the second transmission segment is electrically connected to the first transmission segment with no cabled connection in between.

According to a third aspect of the present invention, there is an assembly for a base station antenna provided. The assembly includes a calibration device and a phase shifter, wherein the calibration device has a first transmission segment for RF signals, the phase shifter has a second transmission segment for RF signals, and the second transmission segment is electrically connected to the first transmission segment with no cabled connection in between.

In some embodiments, the second transmission segment of the phase shifter is configured as a bent trace segment including a first segment and a second segment bent and extending from the first segment toward the calibration device. In some embodiments, the second segment is welded to the first transmission segment.

In some embodiments, the phase shifter further includes a tuning trace segment spaced apart from the second transmission segment, wherein the tuning trace segment extends from the second transmission segment toward the calibration device.

In some embodiments, the tuning trace segment is welded to both the first transmission segment and the second transmission segment.

In some embodiments, the phase shifter has a first ground segment, and the calibration device has a second ground segment, wherein the first ground segment is welded to the second ground segment.

In some embodiments, the phase shifter includes a first printed circuit board, and the calibration device includes a second printed circuit board separate from the first printed circuit board.

According to a fourth aspect of the present invention, there is a phase shifter for a base station antenna provided. The phase shifter includes a second transmission segment configured as a bent RF signal input trace segment, and the bent RF signal input trace segment includes a first segment extending in a first direction and a second segment extending from the first segment in a second direction, the first direction being different from the second direction.

In some embodiments, the second segment is welded to other transmission lines outside the phase shifter. In some embodiments, the other transmission lines include a first transmission segment for RF signals of the calibration device According to a fifth aspect of the present invention, there is a phase shifter for a base station antenna provided. The phase shifter includes a second transmission segment for RF signals extending in a first direction and a tuning trace segment spaced from the second transmission segment and extending in a second direction different from the first direction, wherein the tuning trace segment is configured to maintain electrical isolation from or electrical connection to the second transmission segment as required.

In some embodiments, the tuning trace segment is configured to be welded to the second transmission segment and other transmission lines outside the phase shifter as required.

According to a fifth aspect of the present invention, a base station antenna is provided. The base station antenna comprises an assembly according to one of embodiments of present invention or a phase shifter according to one of embodiments of present invention.

DETAILED DESCRIPTION

Figure 1:
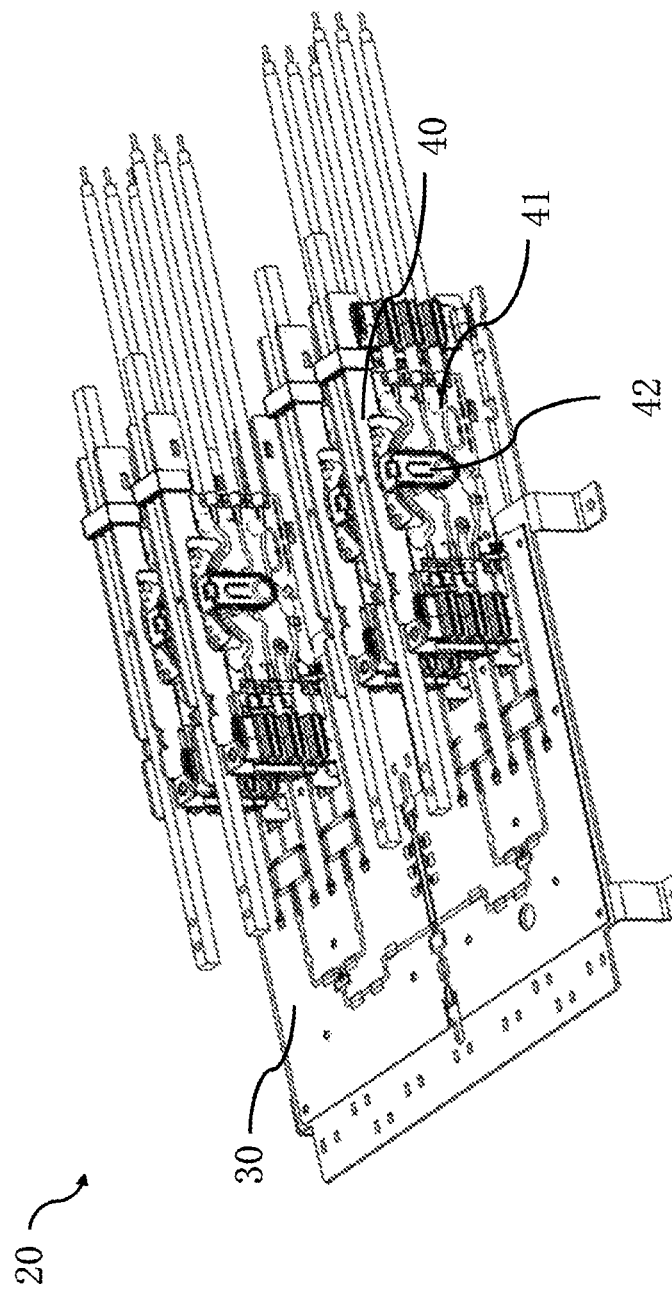
FIG. 1 is a schematic perspective view of an assembly for a base station antenna according to some embodiments of the present invention.

The present invention will be described below with reference to the drawings, in which several embodiments of the present invention are shown. It should be understood, however, that the present invention may be implemented in many different ways, and is not limited to the example embodiments described below. In fact, the embodiments described hereinafter are intended to make a more complete disclosure of the present invention and to adequately explain the scope of the present invention to a person skilled in the art. It should also be understood that the embodiments disclosed herein can be combined in various ways to provide many additional embodiments.

In the drawings, the same reference signs present the same elements. In the drawings, for the sake of clarity, the sizes of certain features may be modified.

It should be understood that the wording in the specification is only used for describing particular embodiments and is not intended to limit the present invention. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed. As used herein, phrases such as "between X and Y" and "between about X and Y" should be interpreted to include X and Y. As used herein, phrases such as "between about X and Y" mean "between about X and about Y". As used herein, phrases such as "from about X to Y" mean "from about X to about Y."

In the specification, when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being "directly on", "directly attached" to, "directly connected" to, "directly coupled" with or "directly contacting" another element, there are no intervening elements present. In the specification, references to a feature that is disposed "adjacent" another feature may have portions that overlap, overlie or underlie the adjacent feature.

In the specification, words describing spatial relationships such as "up", "down", "left", "right", "forth", "back", "high", "low" and the like may describe a relation of one feature to another feature in the drawings. It should be understood that these terms also encompass different orientations of the apparatus in use or operation, in addition to encompassing the orientations shown in the drawings. For example, when the apparatus in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The assembly 20 according to embodiments of the present invention is applicable to various types of base station antennas, for example beamforming antennas. The assembly 20 for a base station antenna may include a calibration device 30 and a phase shifter 40. In the base station antenna, due to uncontrollable errors in the design, manufacture or use of radio frequency (RF) control systems (such as a remote radio unit or "RRU") and/or the or antenna feed networks, a calibration circuit is typically required to compensate for the phase offsets and/or amplitude offsets of the RF signals that are input at different RF ports. This process is often referred to as "calibration". The calibration device 30 is provided to perform the operation of calibration. The phase shifter 40 is provided to adjust the phase shift of at least some of the sub-components of the RF signal. By applying different phase shifts to different sub-components of the RF signal, the downtilt angle of the antenna beam formed by the antenna array can be adjusted.

In conventional base station antennas, such as in beamforming antennas, the phase shifter 40 and the calibration device 30 are usually electrically connected to each other via jumper cables. However, the cabled connection between the phase shifter 40 and the calibration device 30 may cause several problems. First, the cabled connections may occupy a large space within the antenna, which may increases=the difficulty in the overall design and wiring of the antenna system. Second, it may be time-consuming to install the cabled connections and the likelihood of installation errors may be increased. Third, the cost of the cabled connections and the installation costs may increase the overall cost of the antenna.

Pursuant to embodiments of the present invention, the phase shifter 40 and the calibration device 30 can be free from direct cabled connection therebetween, thereby achieving high integration and miniaturization of the overall antenna construction.

Embodiments of the present invention will now be described in more detail with reference to the accompanying drawings.

Refer to FIG. 1, which is a schematic perspective view of an assembly 20 for a base station antenna according to some embodiments of the present invention.

As shown in FIG. 1, the assembly 20 includes a calibration device 30 and a plurality of phase shifters 40 mounted on the calibration device 30. The phase shifters 40 according to embodiments of the present invention may be configured as various types of phase shifters, for example, a slider type phase shifter, a trombone type phase shifter, or a sliding medium phase shifter. Each phase shifter may be configured as a first printed circuit board or may include a first printed circuit board, and the calibration device 30 may be configured as a second printed circuit board or may include a second printed circuit board, where the second printed circuit board is separate from the first printed circuit board.

In FIG. 1, a widely-used electromechanical "slider" type phase shifter 40 is shown, which includes a first printed circuit board 41 and a movable component 42. The first printed circuit board 41 includes a dielectric layer, a metal pattern layer on a first major surface of the dielectric layer, and a ground layer on a second major surface of the dielectric layer. The metal pattern layer includes an RF signal input segment connected to an input port, and a plurality of RF signal output segments connected to one or more output ports respectively. The movable component 42 is configured as a PCB-slider that is rotatable above the metal pattern layer. The phase shifter 40 may configured to divide the input RF signal into a plurality of sub-components, and adjust the phase shift of at least some of the RF signal sub-components that travel from the input port to a respective output port so as to adjust the pattern of the antenna beam.

The phase shifter 40 may be mounted onto the calibration device 30 by various suitable fixing means. The phase shifter 40 may be mounted onto the calibration device 30 by, for example, positive locking, friction-locking, or material-bonding. Specifically, the fixing means may be in the form of bayonet connection, screw connection, rivet connection, welding and/or adhering. In this way, the phase shifter 40 and the calibration device 30 may form a highly integrated assembly. The phase shifter 40 may be mounted on the calibration device 30 at an angle with respect to the calibration device. In the embodiment shown in FIG. 1, the phase shifter 40 and the calibration device 30 are mounted substantially perpendicular to each other. In other embodiments, the phase shifter 40 and the calibration device 30 may also be mounted obliquely to each other, for example, with an included angle of between 30 degrees and 150 degrees, between 45 degrees and 135 degrees, or between 60 degrees and 120 degrees in example embodiments.

Figure 2:
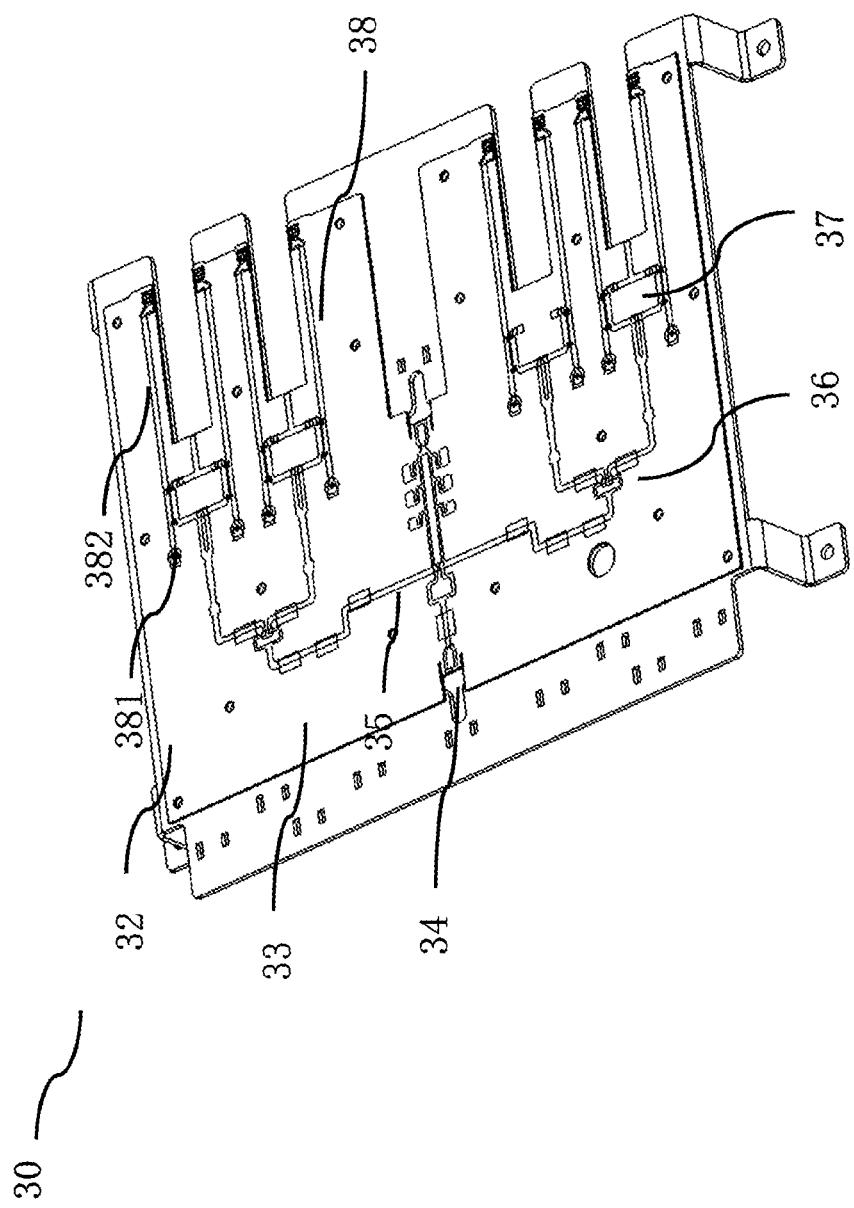
FIG. 2 is a schematic view of a calibration device in the assembly of FIG. 1.

As shown in FIG. 2, the calibration device 30 may be configured as a second printed circuit board, which may include, for example, a dielectric substrate 32, a microstrip calibration circuit 33 disposed on an upper major surface of the dielectric substrate 32, and a ground metal layer (not shown) disposed on a lower major surface of the dielectric substrate. In some embodiments, the microstrip calibration circuit 33 may be implemented in a second printed circuit board including two dielectric substrates, wherein a first ground metal layer may be disposed on an upper surface of the upper dielectric substrate, a second ground metal layer may be disposed on a lower surface of the lower dielectric substrate, and the calibration circuit 33 is provided in a metal layer between the two dielectric substrates. As a result, the calibration circuit 33 is surrounded by the first and second ground metal layers, so that the calibration circuit 33 may be configured as a strip line network. The strip line network may be advantageous in that it may exhibit reduced radiation loss and can protect the RF transmission lines from external radiation. In some embodiments, the calibration device 30 may include, for example, two or more second printed circuit boards, which may be electrically connected to each other via cables.

The calibration circuit 33 may include a calibration port 34, transmission lines 35, power dividers or power combiners 36 and couplers 37. The power dividers/combiners may be configured as Wilkinson power dividers/combiners. The couplers 37 may be configured as directional couplers. The calibration circuit 33 may be used to identify any unintended variations in the amplitude and/or phase of the RF signals that are input to the different RF ports of the antenna.

In some embodiments, a remote radio unit (RRU) (not shown) may input a calibration signal into the calibration port 34 via a cable. The calibration signal is passed from the calibration port 34 via the respective transmission lines 35 to the power dividers 36 which divide the calibration signal into a plurality of sub-components. The sub-components of the calibration signal are passed by the respective couplers 37 to the respective feed branches (hereafter referred to as first transmission segments 38). The first transmission segments 38 may each include an RF port 381, and a transmission trace segment 382 that may be electrically connected to a feed network, such as a phase shift network so as to feed the RF signal from the RF port 381 to the downstream radiating elements. The RRU may read the amplitude and/or phase of the RF signals that are electrically coupled from the calibration circuit 33 to the RF ports 381 via the couplers 37. Thus, calibration can be implemented in terms of the S parameters of the RF ports 381 and the calibration port 34. In other words, calibration can be implemented in terms of the amplitude and/or phase of the RF signals coupled at the RF ports 381 and the amplitude and/or phase of the calibration signal at the calibration port 34. The RRU may accordingly adjust the amplitude and/or phase of the RF signals to be input at the RF ports so as to provide optimized antenna beams.

In this embodiment, the calibration process may include the following steps. First, the RRU electrically couples a calibration signal via a calibration circuit 33 (a calibration port 34, power dividers 36 and couplers 37) to each RF port 381. Then, the RRU reads the amplitude and/or phase of the RF signals at the RF ports 381. Finally, based on the amplitudes and/or phases of the RF signals at the RF ports 381, the RRU performs calibration, that is, assigning different amplitudes and/or phase weight values to the RF signals to be input at the RF ports.

In some embodiments, RRU may first input RF signals into the respective RF ports via cables. Then, the calibration circuit 33 may extract a small amount of each of the RF signals from the respective RF ports by means of couplers 37 and then combine these extracted signals to a calibration signal by means of power combiners 36 and pass the calibration signal back to the RRU that generated the RF signals. Based on the calibration signal, the RRU may accordingly adjust the amplitude and/or phase of the RF signals to be input at the RF ports so as to provide optimized antenna beams.

Next, some electrical connection solutions between the calibration device 30 and the phase shifter 40 in the assembly 20 according to some embodiments of the present invention will be described in detail with reference to FIGS. 3 and 4.

Unlike the conventional electrical connection mode by means of cables, in the assembly 20 according to some embodiments of the present invention, the phase shifter 40 may be electrically connected to the calibration device 30 without a cable. In other words, there is no direct cable connection between the phase shifter 40 and the calibration device 30.

Figure 3:
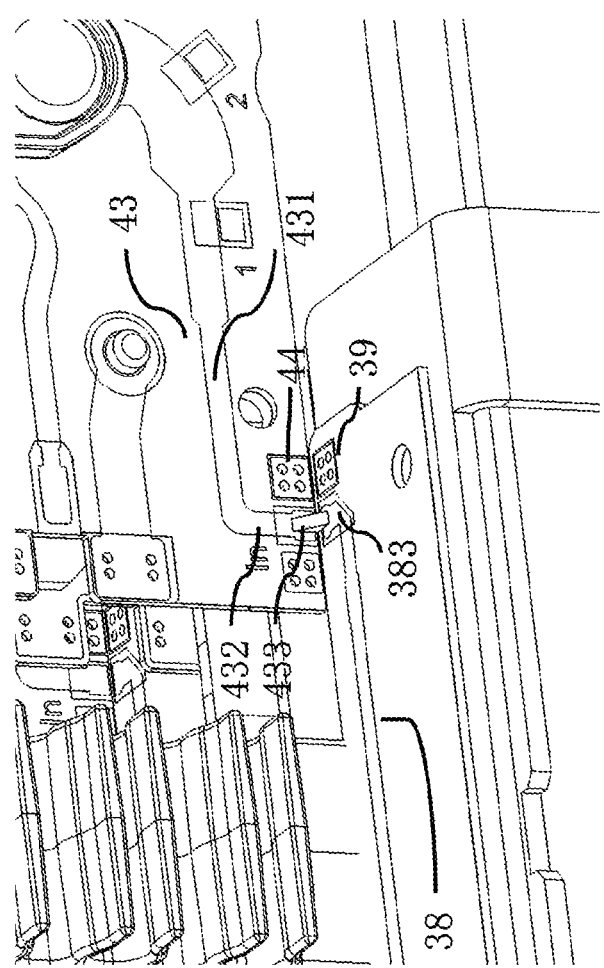
FIG. 3 is a first partially enlarged schematic view of the assembly of FIG. 1, showing in detail a first electrical connection solution between the calibration device and a phase shifter.

Refer to FIG. 3, which is a first partially enlarged schematic view of the assembly 20 according to some embodiments of the present invention, showing in detail a first electrical connection solution between the calibration device 30 and a phase shifter 40. The phase shifter 40 may include an RF signal input segment (hereinafter referred to as a second transmission segment 43), and the second transmission segment 43 may be electrically connected to the corresponding first transmission segment 38 on the calibration device 30 by means of conductive elements. In the embodiment shown in FIG. 3, the second transmission segment 43 may be configured as a bent trace segment including a first segment 431 extending in a first direction and a second segment 432 extending from an end of the first segment 431 in a second direction, where the first direction is different from the second direction. In the embodiment shown in FIG. 3, the second segment 432 is bent substantially perpendicular to the first segment 431 and extends toward the calibration device 30 up to an edge of the phase shifter 40 against the calibration device 30. A first welding region 383 may be provided on the first transmission segment 38 of the calibration device 30, a second welding region 433 may be correspondingly provided on the second segment 432 of the phase shifter 40, and the two welding regions 383,433 are adjacent to each other to enable electrical connection by welding. In other embodiments, the second transmission segment 43 may be electrically connected to the corresponding first transmission segment 38 on the calibration device 30 via other conductive elements, such as a probe. Further, in order to allow good RF signal transmission between the phase shifter 40 and the calibration device 30, the phase shifter 40 may be provided with one or more first ground segments 44 and the calibration device 30 may be provided with one or more second ground segments 39, in which the first ground segment 44 and the corresponding second ground segment 39 may be welded together to achieve a common ground connection between the phase shifter 40 and the calibration device 30.

Figure 4:
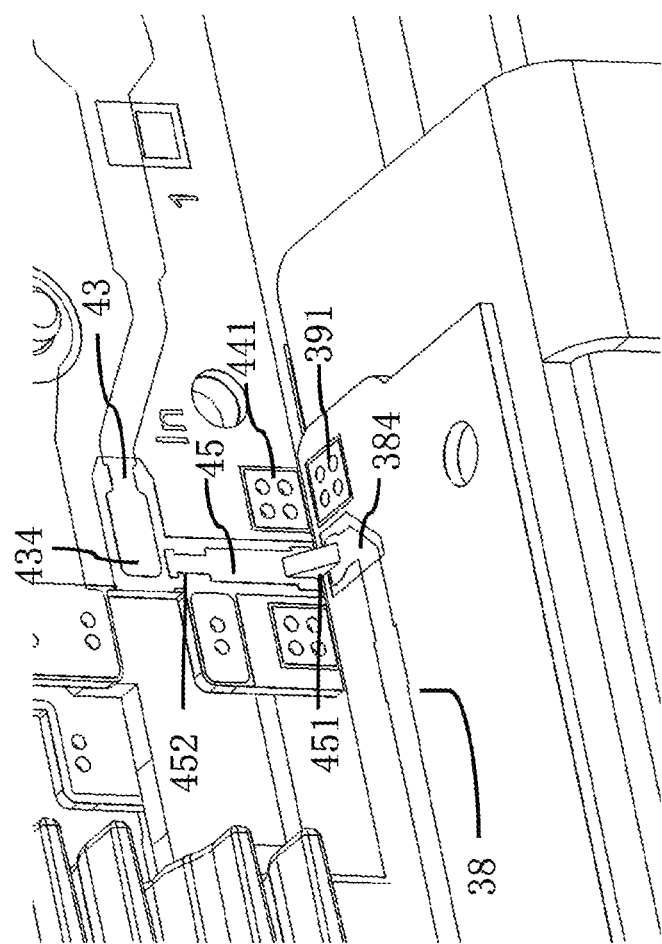
FIG. 4 is a second partially enlarged schematic view of the assembly of FIG. 1, showing in detail a second electrical connection solution between the calibration device and a phase shifter.

Refer to FIG. 4, which is a second partially enlarged schematic view of the assembly 20 according to some embodiments of the present invention, showing in detail a second electrical connection solution between the calibration device 30 and a phase shifter 40. The phase shifter 40 may include an RF signal input segment (hereinafter referred to as a second transmission segment 43), and the second transmission segment 43 may be electrically connected to the corresponding first transmission segment 38 on the calibration device 30 via conductive elements. In the embodiment shown in FIG. 4, the phase shifter 40 may include a second transmission segment 43 extending in a first direction, and a tuning trace segment 45 spaced from the second transmission segment 43 and extending in a second direction different from the first direction. In the embodiment shown in FIG. 4, the tuning trace segment 45 is bent substantially perpendicular to the second segment 43 and extends toward the calibration device 30 up to an edge of the phase shifter 40 against the calibration device 30. A third welding region 384 may be provided on the first transmission segment 38 of the calibration device 30, a fourth welding region 451 may be correspondingly provided on the tuning trace segment 45 of the phase shifter 40, and the two welding regions 384,451 are adjacent each other to enable electrical connection by welding. Meanwhile, a fifth welding region 434 may be provided on the second transmission segment 43 of the phase shifter 40, and a sixth welding region 452 may be correspondingly provided on the tuning trace segment 45 of the phase shifter 40, in which the two welding regions 434, 452 are also adjacent each other. In order to achieve a direct cable-free electrical connection between the phase shifter 40 and the calibration device 30, the tuning trace segment 45 may be welded to the first transmission segment 38 and the second transmission segment 43, respectively. Further, in order to allow good RF signal transmission between the phase shifter 40 and the calibration device 30, the phase shifter 40 may have one or more third ground segments 441, and the calibration device 30 may have one or more fourth ground segments 391, wherein the third ground segment 441 may be welded to the corresponding fourth ground segment 391 to achieve a common ground connection between the phase shifter 40 and the calibration device 30.

The tuning trace segment 45 is advantageous in that it is configured to maintain electrical isolation from or electrical connection to the second transmission segment 43 as required. In the case where the tuning trace segment 45 is maintained in electrical isolation from the second transmission segment 43, the phase shifter 40 can still be electrically connected to other transmission lines outside the phase shifter 40 by means of cables. In the case where the tuning trace segment 45 and the second transmission segment 43 are electrically connected, for example, welded to each other, the phase shifter 40 may be electrically connected to other transmission lines outside the phase shifter 40 without the use of cables. The arrangement of the tuning trace segment 45 increases the flexibility in application of the phase shifter 40

Although the exemplary embodiments of the present invention have been described, a person skilled in the art should understand that, multiple changes and modifications may be made to the exemplary embodiments without substantively departing from the spirit and scope of the present invention. Accordingly, all the changes and modifications are encompassed within the protection scope of the present invention as defined by the claims.

What is claimed is:

1. An assembly for a base station antenna, comprising:
   a calibration device that comprises:
   a plurality of transmission line segments on a printed circuit board;
   a plurality of directional couplers on the printed circuit board and coupled to the respective transmission line segments;
   a power divider network on the printed circuit board and coupled to the directional couplers; and
   a calibration port coupled to the output of the power divider network; and
   a phase shifter that has an input and a plurality of outputs, the phase shifter mounted on the calibration device,
   wherein the input of the phase shifter is electrically connected to the calibration device via a cableless connection.

2. The assembly according to claim 1, wherein the phase shifter is mounted on the calibration device at an angle with respect to the calibration device.

3. The assembly according to claim 2, wherein the angle is within the range of 60° to 120°.

4. The assembly according to claim 1, wherein the calibration device has a first transmission segment for RF signals, and the phase shifter has a second transmission segment for RF signals, wherein the second transmission segment is electrically connected to the first transmission segment.

5. The assembly according to claim 4, wherein the second transmission segment of the phase shifter is configured as a bent trace segment.

6. The assembly according to claim 5, wherein the second transmission trace segment includes a first segment and a second segment bent and extending from the first segment toward the calibration device.

7. The assembly according to claim 6, wherein the second segment is welded to the first transmission segment.

8. The assembly according to claim 1, wherein the phase shifter includes a second transmission segment for RF signals and a tuning trace segment spaced apart from the second transmission segment.

9. The assembly according to claim 8, wherein the tuning trace segment extends from the second transmission segment toward the calibration device.

10. The assembly according to claim 9, wherein the calibration device has a first transmission segment for RF signals, and the tuning trace segment is welded to both the first transmission segment and the second transmission segment.

11. An assembly for a base station antenna, comprising:
a calibration device for a beamforming antenna; and
at least one phase shifter that has an input and a plurality of outputs mounted on the calibration device,
wherein the phase shifter is mounted on the calibration device at an angle with respect to the calibration device, and
wherein a first transmission line segment of the calibration device is directly connected to a second transmission line segment that acts as the input of the phase shifter.

12. The assembly according to claim 11, wherein the angle is within the range of 60° to 120°.

13. An assembly for a base station antenna, comprising:
a calibration device; and
a phase shifter mounted on the calibration device, the phase shifter having an input and a plurality of outputs,
wherein the calibration device has a first transmission segment for RF signals, the phase shifter has a second transmission segment for RF signals that acts as the input of the phase shifter, and the second transmission segment is electrically connected to the first transmission segment with no cabled connection in between, and
wherein the phase shifter has a first ground segment, and the calibration device has a second ground segment, wherein the first ground segment is welded to the second ground segment.

14. The assembly according to claim 13, wherein the second transmission segment of the phase shifter is configured as a bent trace segment including a first segment and a second segment bent and extending from the first segment toward the calibration device.

15. The assembly according to claim 14, wherein the second segment is welded to the first transmission segment.

16. The assembly according to claim 13, wherein the phase shifter further includes a tuning trace segment spaced apart from the second transmission segment, wherein the tuning trace segment extends from the second transmission segment toward the calibration device.

17. The assembly according to claim 16, wherein the tuning trace segment is welded to both the first transmission segment and the second transmission segment.

18. The assembly according to claim 16, wherein the phase shifter includes a first printed circuit board, and the calibration device includes a second printed circuit board separate from the first printed circuit board.

* * * * *